United States Patent [19]

Rogus

[11] Patent Number: 4,787,461
[45] Date of Patent: Nov. 29, 1988

[54] SHAKER ASSEMBLY

[76] Inventor: Thomas E. Rogus, Rte. 2, Box 99, Strandquist, Minn. 56758

[21] Appl. No.: 58,928

[22] Filed: Jun. 5, 1987

[51] Int. Cl.$^4$ ............................................. A01D 33/00
[52] U.S. Cl. ..................................... 171/27; 171/127; 209/308; 209/310
[58] Field of Search .................. 171/14, 25, 27, 71, 171/124, 125, 126, 127, 133; 172/32; 209/308, 310; 474/120, 121, 122, 123, 124, 125, 113, 137

[56] References Cited

U.S. PATENT DOCUMENTS

| | | | |
|---|---|---|---|
| 103,086 | 5/1870 | Russell et al. | 209/308 |
| 493,886 | 3/1893 | Fereva | 209/307 |
| 825,265 | 7/1906 | Dillard | 474/124 |
| 960,571 | 6/1910 | McGrath | 474/137 |
| 1,019,041 | 3/1912 | Green | 209/307 |
| 1,220,304 | 3/1917 | Welffens | 474/113 |
| 1,571,153 | 1/1926 | Wright | 474/137 |
| 2,970,587 | 2/1961 | Estes | 474/113 X |
| 3,106,249 | 10/1963 | Zachery | 171/14 |
| 3,225,771 | 12/1965 | McRobert . | |
| 3,633,677 | 1/1972 | Walker | 171/27 |
| 4,164,294 | 8/1979 | Johnson . | |
| 4,324,336 | 4/1982 | Sandbank | 209/589 |
| 4,416,334 | 11/1983 | Bouillon . | |

FOREIGN PATENT DOCUMENTS 2048040A 12/1980 United Kingdom ................ 171/127

OTHER PUBLICATIONS

Pp. 21, 22, 23, 24, 25 and A1-A3 from the 1987 catalog of Terog Manufacturing.

Primary Examiner—Robert A. Hafer
Assistant Examiner—Samuel Rimell
Attorney, Agent, or Firm—Vidas & Arrett

[57] ABSTRACT

A shaker assembly for use on chain conveyors on harvesters is bolted to the side frame of the conveyors. The shaker assembly includes two spaced roller assemblies which carry rods of the chain conveyor. The distance between the roller assemblies may be varied such that the degree of shaking imparted to the rods as they pass over the shaker assembly may be adjusted.

5 Claims, 3 Drawing Sheets

SHAKER ASSEMBLY

FIELD OF THE INVENTION

This invention relates to shaker assemblies for use on conveyors to impart a shaking motion to the conveyors.

BACKGROUND OF THE INVENTION

Root crop harvesters must be designed to carry the root crop from the ground to a collection station. During that process, debris such as dirt, small stones and vines must be removed without causing damage to the root crop itself.

Typical harvesters for root crops comprise driven endless rod chain conveyors which are either belted chains or hook chains. Root crops such as potatoes are carried on top of generally parallel rod members of the conveyor and smaller materials such as dirt and rocks are able to fall downwardly between the individual rod members.

In order to better remove dirt, rocks and clinging vines from the root crops, harvesters typically include some form of shaker assembly which attempts to set up a steady shaking motion to the chain conveyors. The shaker assemblies are secured to the frame of the conveyor and typically include a multi-lobed member which, as it rotates, allows the conveyor to fall and then suddenly throws the conveyor rods upwardly when a lobe reaches its peak height. An example of such a shaker assembly is seen in U.S. Pat. No. 3,106,249 to Zachery. Zachery describes a harvester for potatoes which has a shaker assembly consisting of a three lobed member. Such traditional shaker assemblies are undesirable in that too severe a shaking is imparted to the conveyor. As such shaker assemblies turn they pick the chain up and move substantially in a lateral direction before reaching the apex. The shakers, only contact every third or fourth rod. This low frequency motion acts like a launching pad. Potatoes, for example, are thrown up into the air and upon landing back on the conveyor are bruised. Bruising causes farmers to lose a great deal of the value of their harvest.

Alternative shaker assemblies have been devised in which numerous lobes are created such that the conveyor is alternatively lifted and lowered more often which results in less violent action on the part of the root crop on the surface of the conveyor. In some schemes, the shaker assemblies are adjustable up and down with hydraulic controls such that the operator can adjust the amount of tossing of the root crop on the conveyor. Such systems, however, require effort in setting up properly.

Other alternatives have been to use large driven rollers which are quite large relative to the spacing between the rods. Of course the drive mechanisms makes the driven rollers more expensive and entail another mechanism which may result in down time.

Another difficulty with prior art devices is that they tend to operate differently depending on the load of the material on the conveyor. Therefore, even in adjustable systems, a conveyor will not be properly adjusted for adequate, yet non-bruising shaking if the weight of dirt and potatoes on the conveyor changes markedly.

BRIEF SUMMARY OF THE INVENTION

The device of the invention is a simple shaker assembly which may be bolted onto the frame of any conventional harvester having a belted or hook rod chain conveyor The device consists of a body securable to the conveyor frame. The device includes a pair of roller assemblies. One of the roller assemblies is fixed to the body and the second roller is bolted to an elongated slot in the body such that the distance between the rollers may be adjusted by moving the second roller relative to the slot. The distance between the rollers relative to the distance between the rods of the chain conveyor may be adjusted such that either a maximal or a minimal wave-like motion is created. The rise and fall may be changed by replacing the rollers with rollers of a different size. Larger rollers relative to the pitch of the rods of the conveyor result in less lift and thereby more gentle shaking.

The device may be adjusted such that as one rod of the conveyor is at the top of a roller the rod or rods contacting the other roller will be below their peak height. This imparts an up and down motion to the entire conveyor without creating violent shaking. The device functions to place a standing wave in the conveyor wherever a device of the invention is situated. Depending on the conveyor and crop to be handled, it is possible to utilize several matched pairs of the devices of the invention to provide effective and non-bruising removal of debris from the root crop.

The distance between the rollers may be adjusted to increase or decrease the height of the "wave." The device puts a vibration into the conveyor rods somewhat like a tuning fork. This provides a very effective shaking action for the removal of debris. In action, potatoes "wiggle" on the conveyor belt because of the effects of the device. The potatoes are constantly and lightly jostled and turned without damage. This is exactly the type of non-bruising separation which is needed. The prior art shake assemblies with their violent action literally throw the potatoes into the air only to be bruised on landing back on the metal rods of the conveyor. If more rigorous motion is desired the rollers may be replaced with smaller diameter rollers.

Another advantage of the invention is that the devices are self-regulating and provide the same desired degree of shaking no matter the weight of dirt and potatoes on the conveyor. Once set up, the devices of the invention are ready to work as long as the conveyor moves. No adjustment is needed. Also, the simplicity of the invention means that down time is not likely to increase with the addition of the shaker assemblies of the invention to the conveyors.

BRIEF DESCRIPTION OF THE DRAWINGS

A detailed description of the invention is hereafter described with specific reference being made to the drawings in which.

DETAILED DESCRIPTION OF THE INVENTION

Figure 1:
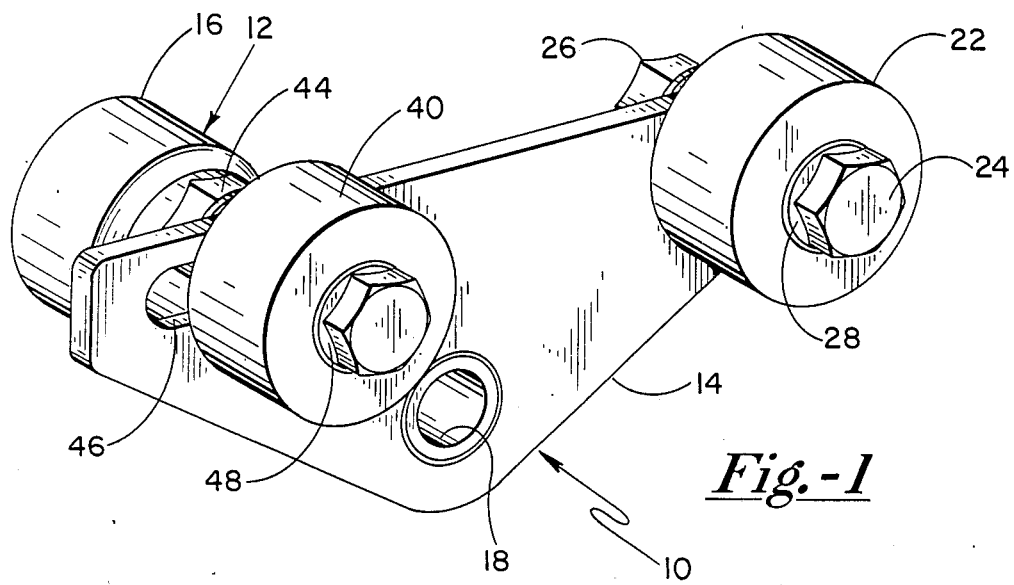
FIG. 1 is a perspective view of the shaker assembly of the invention.

With reference to the figures it will be seen that the shaker assembly device 10 of the invention consists of a body 12 which is comprised of a plate member 14 and a shaft 16. Shaft 16 may include a bore 18 such that the device may be bolted to a frame of a conveyor.

Figure 3:
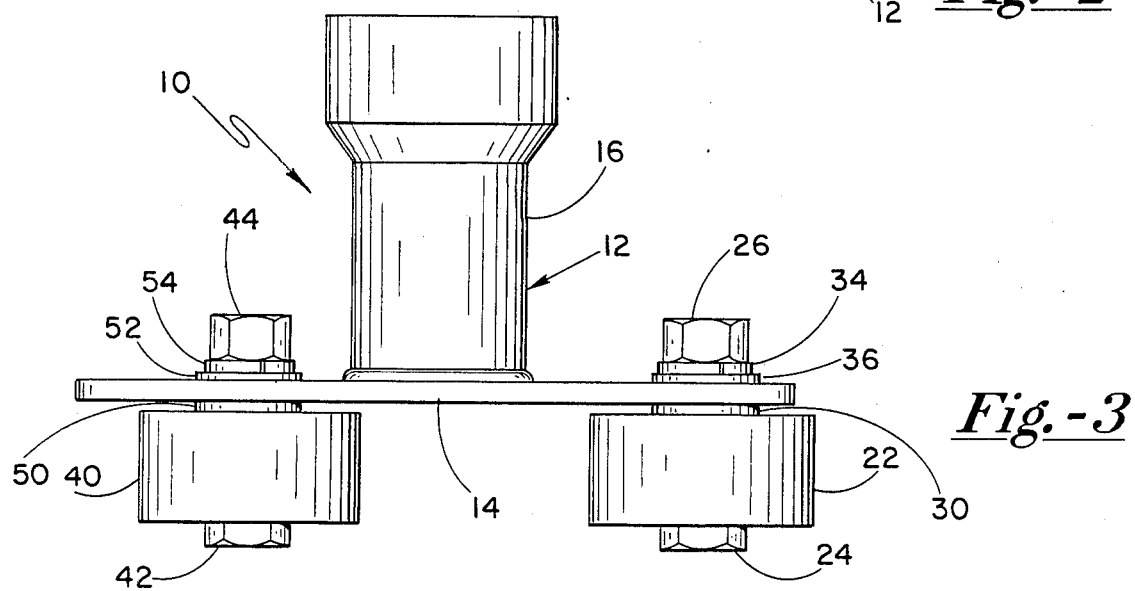
FIG. 3 is a top view of the shaker assembly of FIG. 1.
Figure 4:
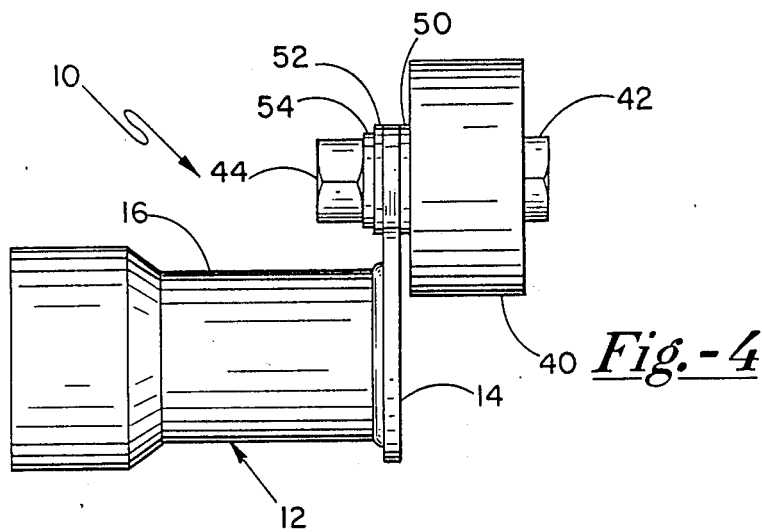
FIG. 4 is a side view of the shaker assembly of FIG. 1.

Device 10 includes a pair of rollers which are secured to plate member 14 so as to be rotatable. The first roller 22 is secured to plate member 14 by a bolt 24 and a nut 26 as shown. Roller 22 may rotate around bolt 24 or more desirably includes a pair of bearings sealed from debris by a pair of seal washers 28, 30. If bearings are used they may be held within the confines of the roller by conventional methods such as by snap rings. Lock washers 34 and flat washers 36 may also be utilized as shown in FIG. 3.

Figure 2:
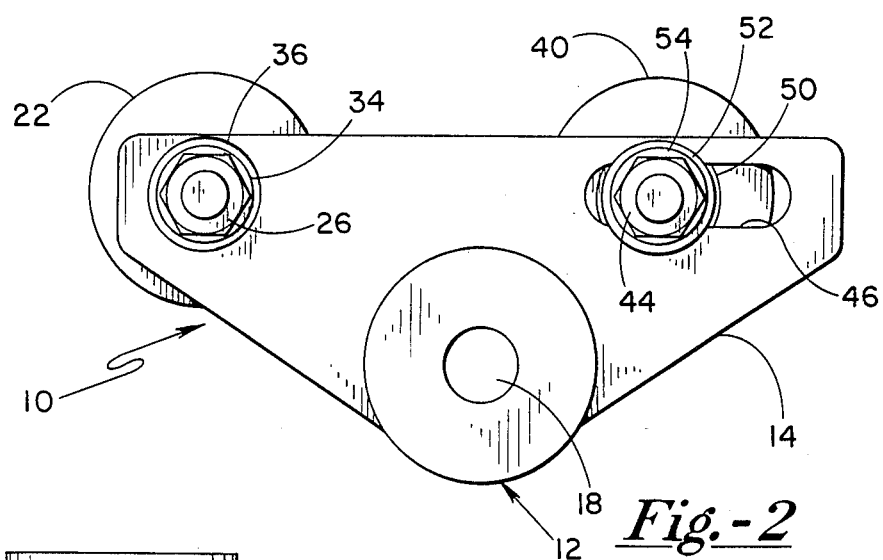
FIG. 2 is a back view of the shaker assembly of FIG. 1.

A second roller 40 is held to the plate member 14 by a bolt 42 and nut 44 as shown. Rather than simply passing through a simple bore, bolt 42 passes through an elongated slot 46 which extends toward the first roller 22 from the right end of the shaker, as seen in FIG. 2. By virtue of this attachment through an elongated s possible to vary the distance between the rollers by sliding roller 40 along the slot prior to tightening. Roller 40 may also include a double sealed bearing or pair of bearings. As shown, roller 40 includes a pair of bearings (not shown) sealed by seal washers 48, 50. A flat washer 52 and lock washer 54 complete the device 10.

Figure 5:
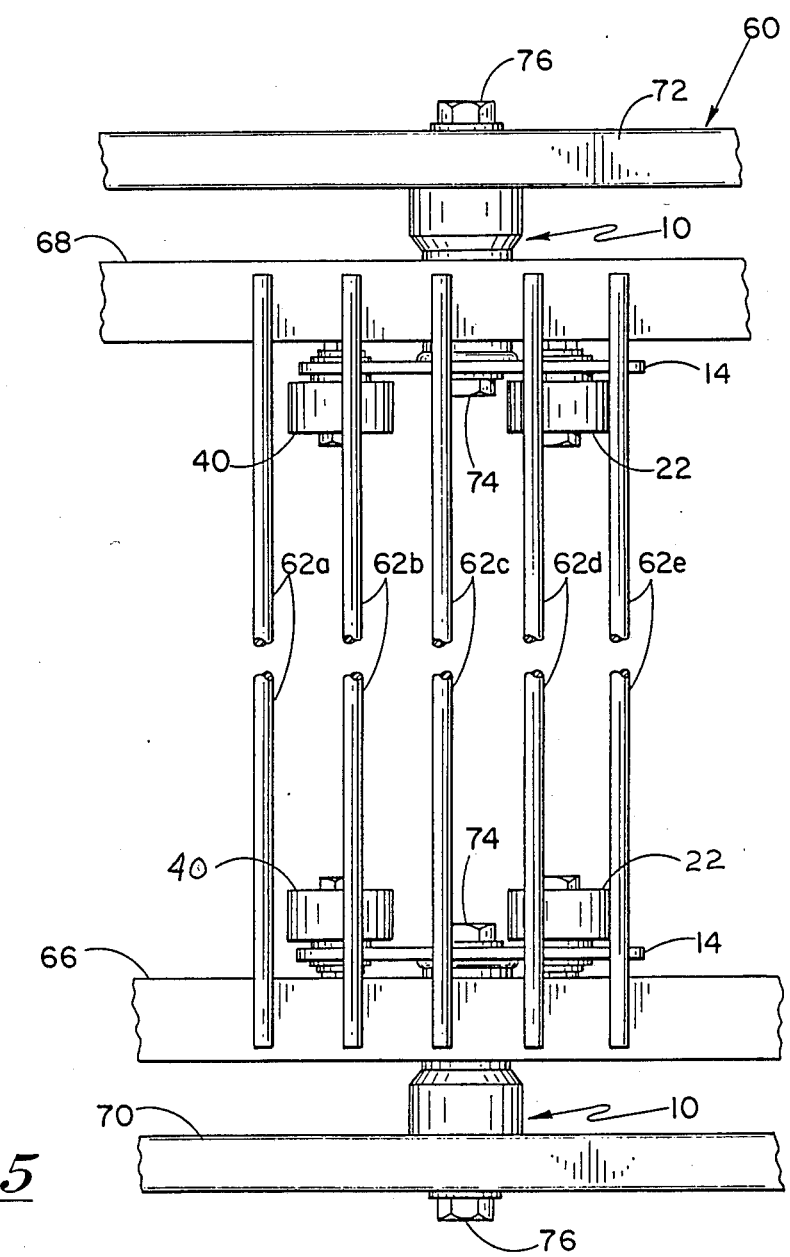
FIG. 5 is a partial schematic representation of a root harvester showing a belted chain conveyor and shaker assemblies of the invention secured to the conveyor frame.

A portion of a belted chain conveyor 60 of a typical root harvester is shown in FIG. 5. Conveyor 60 is of any conventional type and would include sprockets or other type of drive mechanism engagement and rollers at its remote ends as well as a source of power to drive the conveyor. Conveyor 60 includes a plurality of generally parallel rod members 62 of which five are shown as 62 a,b,c,d and e in FIG. 5. The rods are joined and separated by belts 66, 68 as shown. On either side of the belts are the frame members 70, 72 of the conveyor. The shaker devices 10 of the invention are bolted to the frames 70, 72 by bolts 74 which pass into bores 18 of the device shafts 16 and are secured by nuts 76.

The shaker assemblies 10 of the invention are preferably made with either a right or left configuration such that the slots 46 of two shakers mounted on opposite sides of a conveyor may both be oriented toward the same end of the conveyor (see FIG. 5). The roller in the slots are adjusted such that when the other rollers 22 are directly under a rod of the conveyor, the adjustable roller 40 is adjusted to fit just between two rods. In this manner, two rods contact roller 40. When so adjusted, both rollers are in time allowing both sides of the conveyor to be raised and lowered simultaneously.

The waving vibration is also affected by the size of the rollers. As the roller size decreases when the rod spacing remains the same, the waving vibration is increased. When two rods are contacting a roller surface, the optimum angle between the rod, roller and second rod centers is between about 85 to 110 degrees. This entails a matching of the roller diameter relative to the pitch (separation) between the rods of the conveyor.

Roller diameters of about three inches provide effective, yet gentle shaking when the pitch of the rods is between about 2.25 and 2.5 inches. A 2½ inch diameter roller would be appropriate for a rod pitch of about 2 to 2.25 inches.

Figure 6:
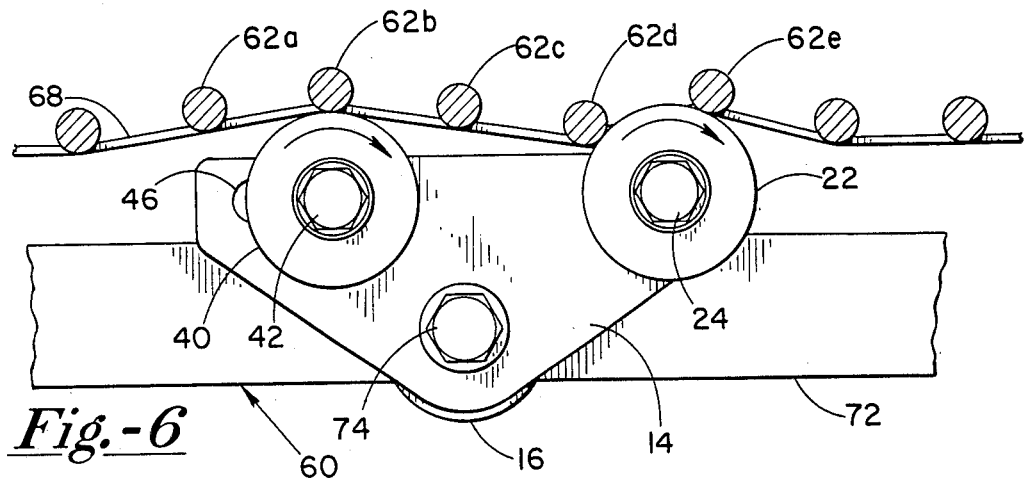
FIG. 6 is a partial front view of the root harvester of FIG. 5 showing the contact of the belted chain with a shaker assembly.
Figure 7:
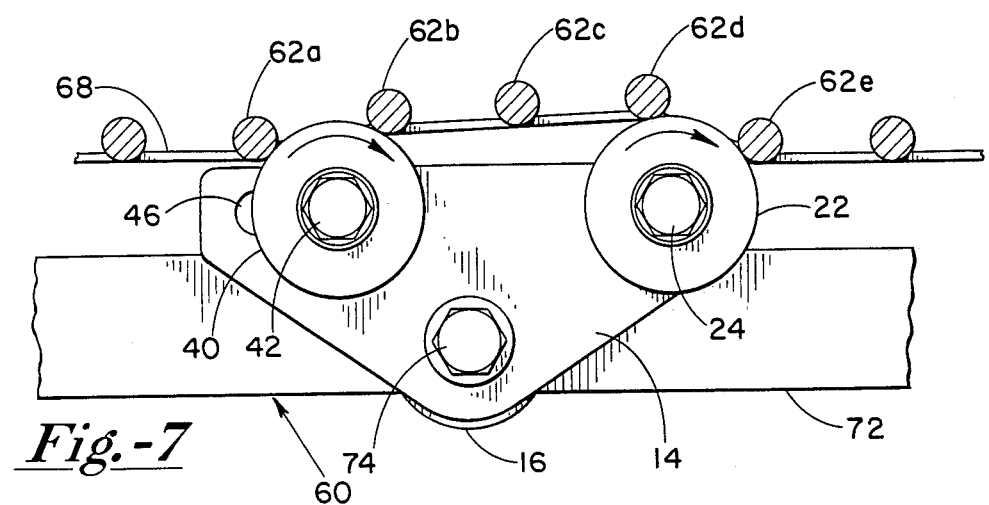
FIG. 7 is a view of the harvester of FIG. 6 in which the belted chain has advanced to show the effect of the shaker assemblies.

As shown in FIGS. 6 and 7, the devices 10 of the invention are constructed and arranged such that the rollers 22 and 40 will be situated below the rods 62 of the conveyor 60. The rods are carried by the rollers as they pass by the device. As one rod 62b reaches the maximum height on top of roller 40, rod 62c descends and rod 62d just contacts roller 22 at a low point. Rod 62e is just past its maximum height and the next rods will be lower after they pass the device.

As shown in FIG. 7, the rods have moved slightly to the right of the drawing such that rod 62b is starting to descend downwardly and rod 62d is almost at its apex. Any root crop material, dirt, small stones or vines on the top of the rods between rollers 22 and 40 will alternatively rise and fall over the wave created as the rods pass the separated rollers. Rather than tossing the crop into the air, the device causes the rods to vibrate and move in a manner somewhat like meeting a standing wave.

Figure 8:
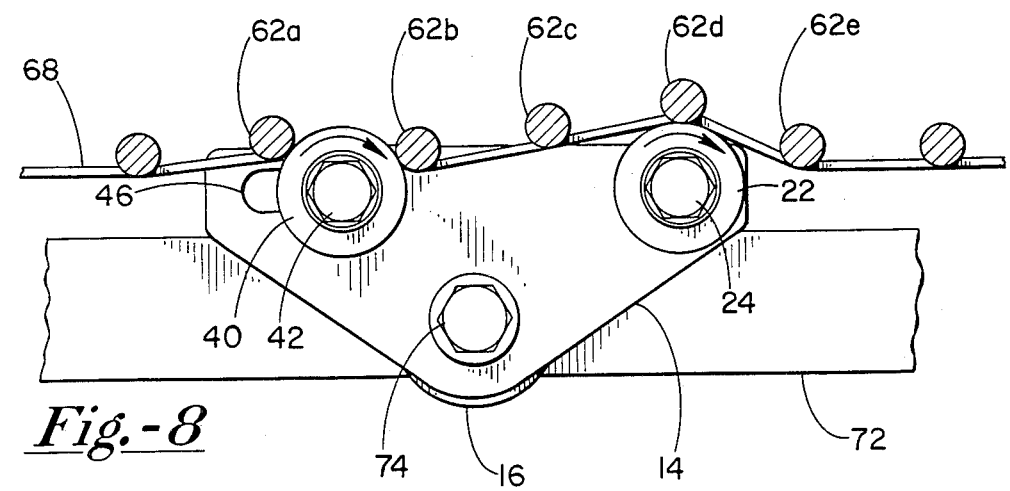
FIG. 8 is a schematic side view of the shaker assemblies of FIG. 6 showing the effect of roller size with the same rod pitch.

The rise and fall of the rods of the conveyor 60 may be selectively varied before starting by altering the distance between the rollers. Since the wave is created by the actions of the rods contacting the rollers it is possible to alter the spacing of the rollers relative to the fixed spacing of the rods. A greater distance between the rollers allows the rods to drop more between the rollers. By carefully selecting the distance between the rollers one can regulate debris removal. Maximal debris removal occurs with greater separation of the rollers, when the rollers are spaced such that as one rod reaches an apex the rods contacting the other roller are at their lowest possible positions and when smaller rollers are utilized. The effect of roller size is shown in FIG. 8.

The devices of the invention may be added to any harvester conveyor in which a shaking action is desired. The devices work best in opposing pairs and may be added at intervals along a conveyor as desired or needed depending on the application. Shaft 16 of body 12 may be shorter or longer as needed depending on the type of conveyor. The shaft length needs to be sufficient to allow the rollers to contact the rods of the conveyor.

In considering this invention it should be remembered that the disclosure is illustrative only and that the scope of the invention is to be determined by the appended claims.

What is claimed is:

1. A shaker assembly for use on driven endless rod chain conveyors of the type having a plurality of substantially parallel, spaced rod members on which root crops may be conveyed, said shaker assembly comprising:
   (a) a body securable to a frame of a chain conveyor, said body including a first opening and a second opening spaced from said first opening;
   (b) means for securing said body to a frame of a chain conveyor;
   (c) a first roller assembly mounted to said body through said first opening; and
   (d) a second roller assembly mounted to said body through said second opening; said second roller assembly being spaced from the first roller assembly by the spacing between said first and second openings, at least one of said openings being elongated in a direction toward the other opening such that the distance between said roller assemblies may be adjusted by moving a roller assembly along the elongated opening.

2. The shaker assembly of claim 1 wherein said roller assemblies include rollers which are mounted on sealed bearings.

3. The shaker assembly of claim 1 wherein said body comprises a plate member to which said roller assembles are mounted by bolts through openings in said plate.

4. The shaker assembly of claim 1 wherein one of said openings is an elongated slot in a plate member of said body, a roller assembly being bolted to said plate member through said elongated slot.

5. In a harvester for root crops comprising a driven endless chain conveyor comprising a plurality of substantially parallel, spaced rod members on which root crops may be conveyed said rods being linked together by hooks or belts, said conveyor further including a frame extending between drive and roller assemblies which support said belts or hooks, the improvement comprising:

shaker assembly means securable to said conveyor frame for imparting a wave-like vibration to said rods;

said shaker assembly means including a body securable to said frame, said body including a first elongated openings and a second opening spaced from said first opening, a first roller assembly secured to said body through said first opening; and a second roller assembly secured to said body through said second opening and being spaced from said first roller by the spacing between said first and second openings, said shaker assembly means body being securable to said conveyor frame such that said rod members may contact the outer surfaces of said first and second rollers, wherein said first opening is a slot elongated in the direction toward said second opening such that said first roller assembly may be moved toward or away from said second roller assembly, said roller spacing being adjustable by moving said first roller assembly within said first opening toward or away from said second roller assembly, said roller assemblies having a diameter relative to the spacing of rods in the conveyor such that the angle between a first rod, roller assembly and second rod when said first and second rods contact said roller assembly is between about 85 and about 110 degrees.

* * * * *

UNITED STATES PATENT AND TRADEMARK OFFICE
CERTIFICATE OF CORRECTION

PATENT NO. : 4,787,461
DATED : November 29, 1988
INVENTOR(S) : Thomas Rogus

It is certified that error appears in the above-identified patent and that said Letters Patent is hereby corrected as shown below:

Col. 3, line 33, delete "s" and insert

--     slot it is     --.

Signed and Sealed this

Twenty-eighth Day of March, 1989

Attest:

DONALD J. QUIGG

Attesting Officer     Commissioner of Patents and Trademarks